United States Patent [19]

Jeričević et al.

[11] Patent Number: 5,986,973
[45] Date of Patent: Nov. 16, 1999

[54] ENERGY MINIMIZATION IN SURFACE MULTIPLE ATTENUATION

[75] Inventors: Željko Jeričević; William H. Dragoset, Jr., both of Houston, Tex.

[73] Assignee: Western Atlas International, Inc., Houston, Tex.

[21] Appl. No.: 08/923,150

[22] Filed: Sep. 4, 1997

[51] Int. Cl.[6] ...................................................... G01V 1/38
[52] U.S. Cl. ................................. 367/24; 367/45; 367/24; 367/53
[58] Field of Search .................................. 367/21, 24, 38, 367/45, 53

[56] References Cited

U.S. PATENT DOCUMENTS

| | | | |
|---|---|---|---|
| 5,138,583 | 8/1992 | Wason et al. ............................... | 367/21 |
| 5,448,531 | 9/1995 | Dragoset et al. ........................... | 367/21 |
| 5,587,965 | 12/1996 | Dragoset, Jr. et al. ..................... | 367/24 |
| 5,719,821 | 2/1998 | Sallas et al. ............................... | 367/21 |
| 5,729,506 | 3/1998 | Dragoset et al. ........................... | 367/21 |

*Primary Examiner*—Christine K. Oda
*Assistant Examiner*—Anthony Jolly

[57] ABSTRACT

A marine seismic signal is transformed from time domain into frequency domain and represented by matrix D. The marine data signal is truncated in time, transformed into the frequency domain and represented by matrix $D_T$. Eigenvalue decomposition $D_T = S\Lambda S^{-1}$ of matrix $D_T$ is computed. Matrix product D S is computed and saved in memory. Conjugate transpose $[D\ S]^*$ is computed and saved in memory. Matrix product $[D\ S]^*[D\ S]$ is computed and saved in memory. Matrix inverse $S^{-1}$ is computed and saved in memory. Conjugate transpose $(S^{-1})^*$ is computed and saved in memory. Matrix product $S^{-1}(S^{-1})^*$ is computed and saved in memory. An initial estimate of the source wavelet w is made. Source wavelet w is optimized by iterating the steps of computing the diagonal matrix $[I-w^{-1}\Lambda]$, computing matrix inverse $[I-w^{-1}\Lambda]^{-1}$, computing conjugate transpose $[(I-w^{-1}\Lambda)^{-1}]^*$, retrieving matrix products $[D\ S]^*[D\ S]$ and $S^{-1}(S^{-1})^*$ from memory, and minimizing the total energy in trace of matrix product $$S^{-1}(S^{-1})^*[(I-w^{-1}\Lambda)^{-1}]^*[D\ S][D\ S][I-w^{-1}\Lambda]^{-1}.$$

Primary matrix P representing the wavefield free of surface multiples is computed by inserting computed value for w into the expression $[D\ S][I-w^{-1}\Lambda]^{-1}S^{-1}$. Primary matrix P is inverse transformed from frequency domain into time domain.

17 Claims, 4 Drawing Sheets

ENERGY MINIMIZATION IN SURFACE MULTIPLE ATTENUATION

BACKGROUND OF THE INVENTION

1. Field of the Invention

The present invention relates generally to marine seismic surveying and, more particularly, to a method for attenuating the effect of surface multiples in a marine seismic signal.

2. Description of the Related Art

Seismic surveying is a method for determining the structure of subterranean formations in the earth. Seismic surveying typically utilizes seismic energy sources which generate seismic waves and seismic receivers which detect seismic waves. The seismic waves propagate into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer. The seismic receivers detect the reflected seismic waves and convert the reflected waves into representative electrical signals. The signals are typically transmitted by electrical, optical, radio or other means to devices which record the signals. Through analysis of the recorded signals, the shape, position and composition of the subterranean formations can be determined.

Marine seismic surveying is a method for determining the structure of subterranean formations underlying bodies of water. Marine seismic surveying typically utilizes seismic energy sources and seismic receivers located in the water which are either towed behind a vessel or positioned on the water bottom from a vessel. The energy source is typically an explosive device or compressed air system which generates seismic energy, which then propagates as seismic waves through the body of water and into the earth formations below the bottom of the water. As the seismic waves strike interfaces between subterranean formations, a portion of the seismic waves reflects back through the earth and water to the seismic receivers, to be detected, transmitted, and recorded. The seismic receivers typically used in marine seismic surveying are pressure sensors, such as hydrophones. Additionally, though, motion sensors, such as geophones or accelerometers may be used. Both the sources and receivers may be strategically repositioned to cover the survey area.

Figure 1:
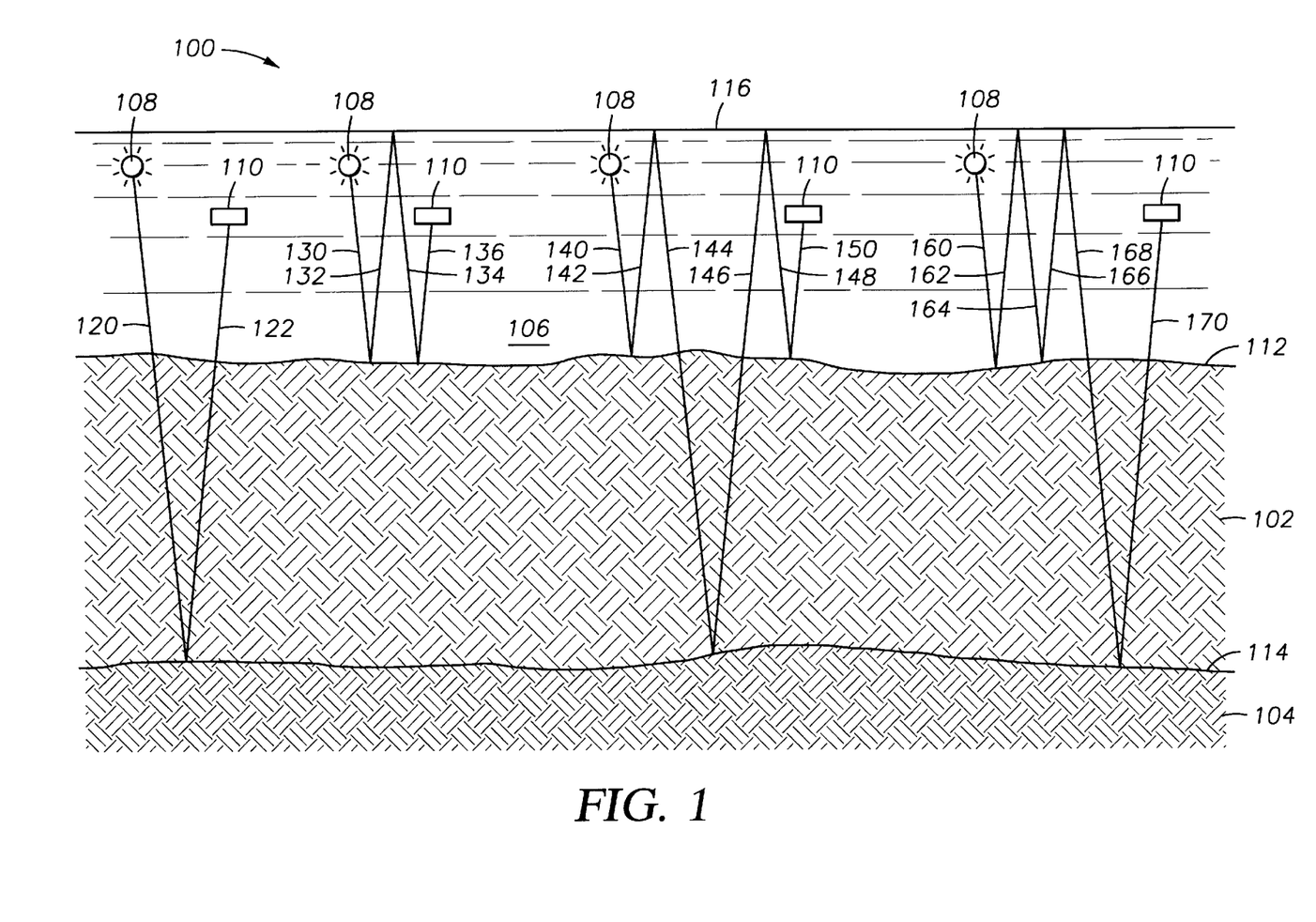
FIG. 1 is a diagrammatic view of marine seismic surveying, showing the source of surface multiples.

Seismic waves, however, reflect from interfaces other than just those between subterranean formations, as would be desired. Seismic waves also reflect from the water bottom and the water surface, and the resulting reflected waves themselves continue to reflect. Waves which reflect multiple times are called "multiples". Waves which reflect multiple times in the water layer between the water surface above and the water bottom below are called "water-bottom multiples". Water-bottom multiples have long been recognized as a problem in marine seismic processing and interpretation, so multiple attenuation methods based on the wave equation have been developed to handle water-bottom multiples. However, a larger set of multiples containing water-bottom multiples as a subset can be defined. The larger set includes multiples with upward reflections from interfaces between subterranean formations in addition to upward reflections from the water bottom. The multiples in the larger set have in common their downward reflections at the water surface and thus are called "surface multiples". FIG. 1, discussed below, provides examples of different types of reflections.

FIG. 1 shows a diagrammatic view of marine seismic surveying. The procedure is designated generally as 100. Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the water toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between subterranean formation, such as interface 114 between formations 102 and 104. When the reflected waves travelling upward reach the water/air interface at the water surface 116, a majority portion of the waves reflects downward again. Continuing in this fashion, seismic waves can reflect multiple times between upward reflectors, such as the water bottom 112 or formation interfaces below, and the downward reflector at the water surface 116 above, as described more fully below. Each time the reflected waves propagate past the position of a seismic receiver 110, the receiver 110 senses the reflected waves and generates representative signals.

Primary reflections are those seismic waves which have reflected only once, from the water bottom 112 or an interface between subterranean formations, before being detected by a seismic receiver 110. An example of a primary reflection is shown in FIG. 1 by raypaths 120 and 122. Primary reflections contain the desired information about the subterranean formations which is the goal of marine seismic surveying. Surface multiples are those waves which have reflected multiple times between the water surface 116 and any upward reflectors, such as the water bottom 112 or formation interfaces, before being sensed by a receiver 110. An example of a surface multiple which is specifically a water bottom multiple is shown by raypaths 130, 132, 134 and 136. The surface multiple starting at raypath 130 is a multiple of order one, since the multiple contains one reflection from the water surface 116. Two examples of general surface multiples with upward reflections from both the water bottom 112 and formation interfaces are shown by raypaths 140, 142, 144, 146, 148 and 150 and by raypaths 160, 162, 164, 166, 168 and 170. Both of these latter two examples of surface multiples are multiples of order two, since the multiples contain two reflections from the water surface 116. In general, a surface multiple is of order i if the multiple contains i reflections from the water surface 116. Surface multiples are extraneous noise which obscures the desired primary reflection signal.

Surface multiple attenuation is a prestack inversion of a recorded wavefield which removes all orders of all surface multiples present within the marine seismic signal. Unlike some wave-equation-based multiple-attenuation algorithms, surface multiple attenuation does not require any modeling of or assumptions regarding the positions, shapes and reflection coefficients of the multiple-causing reflectors. Instead, surface multiple attenuation relies on the internal physical consistency between primary and multiple events that must exist in any properly recorded marine data set. The information needed for the surface multiple attenuation process is already contained within the seismic data.

In the following discussion, let the original seismic wavefields, the corresponding recorded data sets, or the corresponding data cubes or matrices be represented by the same upper-case letters. Thus let D represent a marine seismic data set corresponding to a wavefield D. The wavefield D can be divided into two parts, $$D = P + M \tag{1}$$

The primary wavefield, P, represents that portion of D which contains no surface multiples. The surface multiples wavefield, M, represents that portion of D which contains surface multiples of any order. Surface multiple attenuation is a processing method for removing the multiples wavefield M from the recorded wavefield D to yield the desired primary wavefield P.

For each i from 1 to $\infty$, let $M_i$ represent that portion of M containing surface multiples of order i. Then the surface multiple wavefield M can be further decomposed into an infinite sum of different orders, $$M = M_1 + M_2 + \ldots + M_i + \ldots \tag{2}$$

Recorded data sets have a finite duration, so only a finite number of terms from Eq. (2) are needed to represent the corresponding wavefield. Substituting an appropriately truncated Eq. (2) into Eq. (1) yields $$D = P + M_1 + M_2 + \ldots + M_n, \tag{3}$$

for some value n.

The process of surface multiple attenuation assumes that surface multiple events $M_i$ of order i can be predicted from knowledge of both the surface multiple events $M_{i-1}$ of order i–1 and the primary wavefield P. This assumption means that there exists some mathematical operator O such that $$M_i = POM_{i-1}. \tag{4}$$

Inserting Eq. (4) into Eq. (3) and factoring out first P and then O yields $$D = P + POP + POM_1 + \ldots + POM_{n-1} \tag{5}$$
$$= P[1 + O(P + M_1 + \ldots + M_{n-1})].$$

Define a truncated version $D_T$ of D by $$D_T = P + M_1 + \ldots + M_{n-1} \tag{6}$$
$$= D - M_n$$

In practice, as will be discussed later, $D_T$ would be approximated by truncating the seismic traces in D in time rather than actually constructing and subtracting $M_n$ from D. Inserting Eq. (6) into Eq. (5) yields the compact form $D = P[1 + OD_T] + tm$ (7)

Eq. (7) is a formula for recursive forward modeling of surface multiples. Eq. (7) represents adding the events of order n to the wavefield containing all events up to and including order n–1. If the bracketed expression in Eq. (7) has an inverse, then Eq. (7) can be inverted to yield $$P = D[1 + OD_T]^{-1}. \tag{8}$$

Eq. (8) is the inverse of the recursive forward modeling equation, Eq. (7). Eq. (8) states that if a suitable operator O can be found, then the primary wavefield P, free of surface multiples, can be computed directly from the recorded wavefield D. The operator O being suitable means that the operator O must be both geophysically and mathematically plausible. The operator O being geophysically plausible means that the operator O satisfies Eq. (4). The operator O being mathematically plausible means firstly that the factorizations in Eq. (5) are valid and secondly that the inverse of the bracketed expression in Eq. (7) exists and thus Eq. (8) is valid. The Kirchhoff integral, a mathematical statement of Huygens' principle, honors the wave equation and can be used as the basis of a geophysically suitable operator O.

Use of the Kirchhoff integral provides the appropriate two- or three-dimensional generalization of the inverse of the recursive forward modeling equation for surface multiple attenuation, as given by Eq. (8). The Kirchhoff integral must be made compatible with Eqs. (4) through (8). First, the recorded marine seismic data are Fourier transformed from the time domain to the frequency domain. Let individual seismic traces or events within the wavefields or data sets be represented by lower-case letters. Thus $m_i$, is a multiple event of order i within a seismic trace d in the wavefield D. Let p and m represent single-frequency components of Fourier-transformed seismic traces. For example, $m_i(s,r)$ is one frequency component of the seismic trace whose source and receiver were at positions s and r, respectively, and which contains only surface multiples of order i. Let $m_{M,i-1}$ represent $m_{i-1}$ after being modified to include the scale and phase corrections and the obliquity factor required by the Kirchhoff integral. The Kirchhoff modification is given by $$m_{M,i-1}(x,r) = (1-j)\sqrt{\omega/4\pi} \cos[\sin^{-1}(k_x V/\omega)] m_{i-1}(x,r), \tag{9}$$

where
x = inline coordinate,
j = $(-1)^{1/2}$
$\omega$ = angular frequency,
$k_x$ = x-component of wavenumber vector, and
V = speed of sound in water.

Because of $k_x$, the modification of $m_{i-1}$ is dip-dependent. In the frequency domain, the Kirchhoff integral can be written as $$m_i(s,r) = -\int p(s,x) m_{M,i-1}(x,r) dx. \tag{10}$$

The minus sign is due to the negative reflection coefficient of the water surface.

In practice, recorded wavefields are not continuous in x, so the Kirchhoff integral in Eq. (10) has to be replaced by the following discrete summation over x $$m_i(s,r) = -\Sigma p(s,x) m_{M,i-1}(x,r). \tag{11}$$

Except for the minus sign, Eq. (11) is the formula for computing an element of the product of two matrices. Thus, define matrix $M_{i-1}$, as the matrix whose columns are the common-receiver records, $m_{i-1}(x,r)$, define matrix $M_{M,i-1}$ as the matrix whose columns are the Kirchhoff-modified common-receiver records, $m_{M,i-1}(x,r)$, and define matrix P as the matrix whose rows are the common-shot records, p(s,x). Then Eq. (11) becomes $$M_i = PM_{M,i-1}. \tag{12}$$

Since the matrix indices are the shot and receiver coordinates, the zero-offset seismic traces lie along the main diagonal of each matrix. If the operator O in Eq. (4) is matrix multiplication and the quantities in uppercase are matrices, then Eq. (4) becomes Eq. (12) and so Eq. (8) becomes $$P=D[I-D_M]^{-1}, \quad (13)$$

where I is the identity matrix and the "−1" superscript indicates matrix inversion.

Eq. (13) provides a simple algorithm for two-dimensional surface multiple attenuation for ideal data. By "ideal" is meant that the wavefield is recorded broadband, contains no noise, has all wavelet effects, including source and receiver ghosts, removed, and has a trace-offset range that begins at zero offset. Furthermore, each individual sample within the ideal data set D must have a true relative amplitude with respect to every other sample within D. For non-ideal data, wavelet effects have not been removed and are the major factor which must be taken into consideration. In theory, this problem is easily fixed by redefining operator O to include a convolution by the inverse of the source wavelet w. Eq. (13) becomes $$P=D[I-w^{-1}D_M]^{-1}, \quad (14)$$

where $w^{-1}$ is the wavelet inverse. Since Eq. (14) is in the frequency domain, convolution is accomplished by multiplication.

In practice, however, the source wavelet w is initially unknown. The source wavelet w can be found by minimizing the total energy in P in Eq. (14). Thus surface multiple attenuation becomes an $L_2$-norm minimization problem, which has standard methods of finding the solution, such as the conjugate gradient technique. One could also minimize other measures of the surface multiple energy in P.

The computation of P as described above requires computing the source wavelet w by minimizing the total energy in P in an iterative loop. This requires computing the inverse of the matrix quantity in brackets in Eq. (14) during each iteration for a new value of w. Computing the inverse of the matrix may be accomplished by a series expansion or an exact matrix inversion. The series expansion approach is approximate and can be slowly converging. Previous exact approaches to surface multiple attenuation require a large number of inversions of large square matrices. Square matrix inversion is computationally expensive.

U.S. Pat. No. 5,587,965 to Dragoset & Jericevic, titled "Surface Multiple Attenuation Via Eigenvalue Decomposition" describes a method using eigenvalue decomposition in an exact approach to solving Eq. (14) which is specially designed to make computing the matrix inverse in each iteration much less costly. The eigenvalue decomposition of matrix $D_M$ is computed, yielding $$D_M=S\Sigma S^{-1}. \quad (15)$$

Here $\Lambda$ is the diagonal matrix whose diagonal elements are the eigenvalues $\lambda_i$ of $D_M$, that is, $\Lambda=\text{diag}[\lambda_i]$. S is the square matrix whose columns are the corresponding eigenvectors of $D_M$ and $S^{-1}$ is the matrix inverse of S. Inserting Eq. (15) into Eq. (14) yields $$P=D[I-w^{-1}S\Lambda S^{-1}]^{-1}. \quad (16)$$

Substituting $I=S\,S^{-1}$ and factoring S and $S^{-1}$ out to the left and right, respectively, allows one to rewrite Eq. (16) as $$P=D\,S\,[I-w^{-1}\Lambda]^{-1}S^{-1}. \quad (17)$$

Now the expression in brackets in Eq. (17) is a diagonal matrix, since both I and $\Lambda$ are diagonal matrices and $w^{-1}$ is a complex scalar. Thus Eq. (17) can also be written as $$P=D\,S\,\text{diag}\,[1/(I-w^{-1}\lambda_i)]S^{-1}.$$

The expression in brackets in Eq. (17) can be inverted many times at low cost.

This derivation is described in U.S. Patent No. 5,587,965 to Dragoset & Jericevic. In their method, the matrix product D S and the inverse $S^{-1}$ are computed only once and then saved in memory. After that initial cost, the incremental cost of recomputing Eq. (17) is that of a matrix multiplication and a diagonal matrix inversion, whereas the incremental cost of recomputing Eq. (14) is that of a matrix multiplication and a square matrix inversion. If the dimension of the square matrices involved is N, then recomputing Eq. (14) takes approximately $2N^3$ order of magnitude floating point operations for each iteration, while recomputing Eq. (17) takes only approximately $(N^3+N)$ order of magnitude operations for each iteration but the first.

SUMMARY OF THE INVENTION

The present invention is a method for substantially attenuating surface multiples from a marine seismic signal. The marine seismic signal is truncated in time. Both the marine seismic signal and the truncated signal are transformed from time domain into frequency domain and represented by matrices D and $D_T$, respectively. Next, eigenvalue decomposition $D_T=S\Lambda S^{-1}$ is computed. Here $\Lambda$ is the diagonal matrix whose elements are the eigenvalues of $D_T$, and S is the square matrix whose columns are the corresponding eigenvectors of $D_T$. $S^{-1}$ is the matrix inverse of S. Matrix product D S is computed and its conjugate transpose $[D\,S]^*$ is computed. Matrix product $[D\,S]^*[D\,S]$ is computed and saved in memory. Matrix inverse $S^{-1}$ is computed and its conjugate transpose $(S^1)^*$ is computed. Matrix product $(S^{-1})(S^{-1})^*$ is computed and saved in memory. An initial estimate for the source wavelet w is made. Diagonal matrix $[I-w^{-1}\Lambda]$ is computed, matrix inverse $[I-w^{-1}\Lambda]^{-1}$ is computed, and its conjugate transpose $[(I-w^{-1}\Lambda)^{-1}]^*$ is computed. The matrix products $[D\,S]^*[D\,S]$ and $(S^{-1})(S^{-1})^*$ are retrieved from memory and the matrix product $$S^{-1}(S^{-1})^*[(I-w^{-1}\Lambda)^{-1}]^*[D\,S]^*[D\,S][I-w^{-1}\Lambda]^{-1}$$

is computed. The source wavelet w is optimized by minimizing the total energy in the matrix trace of the matrix product $$tr\{S^{-1}(S^{-1})^*[(I-w^{-1}\Lambda)^{-1}]^*[D\,S]^*[D\,S][I-w^{-1}\Lambda]^{-1}\},$$

using an iterative loop. Then primary matrix P is computed by inserting the optimized value for the source wavelet w into the expression $P=[D\,S][I-w^{-1}\Lambda]^{-1}S^{-1}$. Finally, matrix P is inverse transformed from the frequency domain into the time domain.

BRIEF DESCRIPTION OF THE DRAWINGS

A better understanding of the benefits and advantages of the present invention may be obtained from the appended detailed description and drawing figures, wherein.

DESCRIPTION OF THE PREFERRED EMBODIMENTS

Comparison of computational paths for prior algorithm, Eq. (14), and eigenvalue decomposition algorithm, Eq. (17), reveals that for all but the first iteration in the optimization of $w^{-1}$, the $N^3$ process involved in the construction and the inversion of matrix $(I-w^{11}D_M)$ in the prior algorithm is traded for N multiplications and divisions in the eigenvalue decomposition algorithm. However, both algorithms still contain the full matrix multiplication operation in each iteration, which is again an $N^3$ process.

The reason for this latter computational expense is that the total energy E in primary matrix P is computed by multiplying each element in P by its complex conjugate and summing all the products $$E = \sum_{i=1}^{i=N} \sum_{j=1}^{j=N} p_{i,j} p_{i,j}^\dagger \qquad (18)$$

where the dagger t indicates the complex conjugate of the matrix element $P_{i,j}$. The problem with using Eq. (18) as the energy formula is that P, being a function of $w^{-1}$, must be explicitly evaluated in each iteration. Thus each iteration requires a full matrix multiplication with $N^3$ multiplications.

If, however, the energy minimization problem is expressed in linear algebra terms using properties of a trace of a matrix, designated tr{X} for any matrix X, then the computations can be considerably simplified. The trace of a matrix product is defined as $$tr\{X\ Y\} = \sum_{i=1}^{i=N} \sum_{j=1}^{j=N} x_{i,j} y_{j,i},$$

for any matrices $X=\{x_{i,j}\}$ and $Y=\{y_{j,i}\}$. Let the asterisk * denote conjugate transpose, or adjoint, of a matrix. Then the energy expression given by Eq. (18) can be rewritten as $$E=tr\{P\ P^*\}. \qquad (19)$$

The conjugate transpose of a matrix product obeys the following product rule $$(X\ Y)^* = Y^*\ X^*$$

for any matrices X and Y. The trace of a matrix product obeys the following circularity rule $$tr\{X\ Y\ Z\} = tr\{Y\ Z\ X\} = tr\{Z\ X\ Y\}$$

for any matrices X, Y and Z. Using these two rules, the energy expression given by Eq. (19) can be rewritten as $$E = tr\{\{DS(I-w^{-1}\Lambda)^{-1}S^{-1}\}\{DS(I-w^{-1}\Lambda)^{-1}S^{-1}\}^*\} \qquad (20)$$

$$= tr\{DS(I-w^{-1}\Lambda)^{-1}S^{-1}(S^{-1})^*[(I-w^{-1}\Lambda)^{-1}]^*(DS)^*\}$$

$$= tr\{S^{-1}(S^{-1})^*[(I-w^{-1}\Lambda)^{-1}]^*(DS)^*DS(I-w^{-1}\Lambda)^{-1}\}.$$

Substituting the matrices A and B defined by $$A=S^{-1}(S^{-1})$$

and $$B=(D\ S)^*D\ S=S^*D^*D\ S,$$

the energy expression given by Eq. (20) can be rewritten as $$E=tr\{A\ [(I-w^{-1}\Lambda)^{-1}]^*B(I-w^{-1}\Lambda)^{-1}\}. \qquad (21)$$

Define the elements of matrices A and B by $A=\{a_{i,j}\}$ and $B=\{b_{j,i}\}$. Then, in explicit form, Eq. (21) is given by $$E = \sum_{i=1}^{i=N} \sum_{j=1}^{j=N} a_{i,j} [(1-w^{-1}\lambda_j)^{-1}]^\dagger b_{j,i} (1-w^{-1}\lambda_i)^{-1} \qquad (22)$$

$$= \sum_{i=1}^{i=N} (1-w^{-1}\lambda_i)^{-1} \sum_{j=1}^{j=N} a_{i,j} [(1-w^{-1}\lambda_j)^{-1}]^\dagger b_{j,i}.$$

The above expressions in Eq. (22) reveal that for all but the first iteration, the number of operations in evaluating the energy E can be reduced from $N^3$ to $3N^2$. The number of operations can be reduced even further to $2N^2$, if the product of the terms $a_{i,j}$ and $b_{j,i}$ are precomputed once and stored.

Alternatively, the optimization problem can be solved by finding the root of the following equation $$\frac{\partial E}{\partial w} = 0.$$

In the case in which matrix rows are tapered to remove edge effects, the approach remains the same, except that matrix B is changed. Let T be a tapering matrix, which is real and diagonal. Using the definition of the primaries matrix P given in Eq. (17), the energy expression of Eq. (19) now becomes $$E = tr\{TP(TP)^*\} \qquad (23)$$

$$= tr\{\{TDS(I-w^{-1}\Lambda)^{-1}S^{-1}\}\{TDS(I-w^{-1}\Lambda)^{-1}S^{-1}\}^*\}$$

$$= tr\{TDS(I-w^{-1}\Lambda)^{-1}S^{-1}(S^{-1})^*[(I-w^{-1}\Lambda)^{-1}]^*(DS)^*T\}$$

$$= tr\{S^{-1}(S^{-1})^*[(I-w^{-1}\Lambda)^{-1}]^*(DS)^*TTDS(I-w^{-1}\Lambda)^{-1}\}.$$

Substituting the matrix A from above and the matrix $B_t$ defined by $$B_t = (D\ S)^*T\ T\ D\ S = S^*D^*T\ T\ D\ S,$$

then the energy expression given by Eq. (23) can be written as $$E=tr\{A[(I-w^{-1}\Lambda)^{-1}]^*B_t(I-w^{-1}\Lambda)^{-1}\}.$$

This is the same as Eq. (21) above, except that matrix B is replaced by matrix $B_t$.

In the case in which the matrix columns are tapered to remove edge effects, the approach remains the same, but now matrix A is changed instead of matrix B. Define matrix $A_t$ by $$A_t = S^{-1} T (S^{-1})^*.$$

Then the energy expression of Eq. (19) becomes $$\begin{aligned}E &= tr\{PT(PT)^*\}\\ &= tr\{\{DS(I-w^{-1}\Lambda)^{-1}S^{-1}T\}\{DS(I-w^{-1}\Lambda)^{-1}S^{-1}T\}^*\}\\ &= tr\{DS(I-w^{-1}\Lambda)^{-1}S^{-1}T(S^{-1}T)^*[(I-w^{-1}\Lambda)^{-1}]^*(DS)^*T\}\\ &= tr\{S^{-1}TT(S^{-1})^*[(I-w^{-1}\Lambda)^{-1}]^*(DS)^*DS(I-w^{-1}\Lambda)^{-1}\}\\ &= tr\{A_t[(I-w^{-1}\Lambda)^{-1}]^*B(I-w^{-1}\Lambda)^{-1}\}.\end{aligned}$$

Again, this is the same as Eq. (21) above, except that now matrix A is replaced by matrix $A_t$.

All of the seismic traces in a data set are Fourier-transformed and inserted into a data cube, $D(s,r,f)$. Here s is source position, r is receiver position, and f is frequency. Next, the original seismic traces are also truncated in time, Fourier-transformed, Kirchhoff-modified, and inserted into another data cube, $D_M(s,r,f)$. For each frequency f, matrices $D(s,r)$ and $D_M(s,r)$ are extracted from the data cubes $D(s,r,f)$ and $D_M(s,r,f)$, respectively. An initial estimate for the value of the source wavelet w component for a particular frequency is made and inserted into the energy expression Eq. (20) along with $D(s,r)$ and $D_M(s,r)$. Eq. (20) gives an expression for the total energy in the primary matrix $P(s,r)$ as a function of the complex scalar w. A value for the wavelet w is computed by minimizing the total energy in the expression for $P(s,r)$. This minimization is done by iterating through values of wavelet w in Eq. (20). Inserting the computed value for w into Eq. (14) yields matrix $P(s,r)$, which is inserted into an output data cube, $P(s,r,f)$. Eq. (20) has to be solved for all frequencies independently. Finally, each seismic trace in data cube $P(s,r,f)$ is inverse Fourier transformed and reorganized into gathers.

Figure 2:
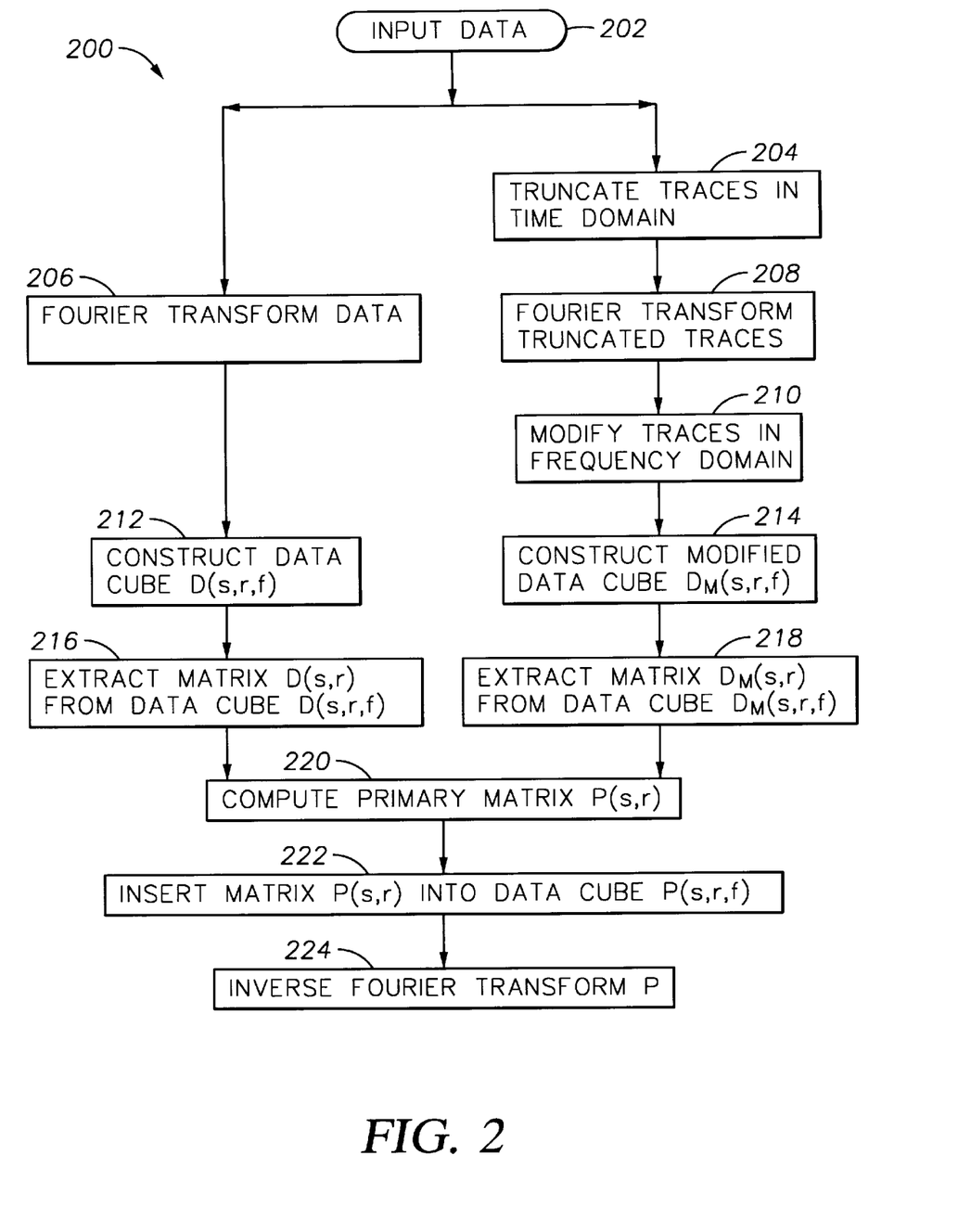
FIG. 2 is a schematic diagram of the general method of surface multiple attenuation.

FIG. 2 shows a schematic diagram of the general method for attenuating surface multiples from a marine seismic signal. The method is designated generally as 200. A two-dimensional marine data set is recorded as a seismic signal, as shown in Block 202. The seismic traces which comprise the data set are truncated in time, as shown in Block 204. Both the data set from Block 202 and the truncated seismic traces from Block 204 are Fourier transformed from the time domain into the frequency domain, as shown in Blocks 206 and 208, respectively. The transformed truncated seismic traces are modified in the frequency domain to include the obliquity, scale and phase factors required by the Kirchhoff integral and given by Eq. (9), as shown in Block 210. The transformed data are used to construct a data cube $D(s,r,f)$, as shown in Block 212. Here s is source location, r is receiver location, and f is frequency. The modified seismic traces are used to construct another data cube, the modified data cube $D_M(s,r,f)$, as shown in Block 214. Next, the series of steps in Blocks 216, 218, 220 and 222 are repeated for each value of frequency f in data cube $D(s,r,f)$. Thus, for each frequency f, a matrix $D(s,r)$ is extracted from data cube $D(s,r,f)$, as shown in Block 216, and a modified matrix $D_M(s,r)$ is extracted from modified data cube $D_M(s,r,f)$, as shown in Block 218. For each frequency f, the primary matrix $P(s,r)$ is computed from matrices $D(s,r)$ and $D_M(s,r)$, as shown in Block 220. The computation of the matrix P in Block 220 involves the solving of Eq. (8) as given by Eq. (20) and will be discussed in greater detail below. In particular, the present invention is an improved method for computing P. For each frequency f, the matrix $P(s,r)$ is inserted into data cube $P(s,r,f)$, as shown in Block 222, thus constructing the primary data cube P. Finally, the data cube P is inverse Fourier transformed from the frequency domain into the time domain, as shown in Block 224.

Figure 3:
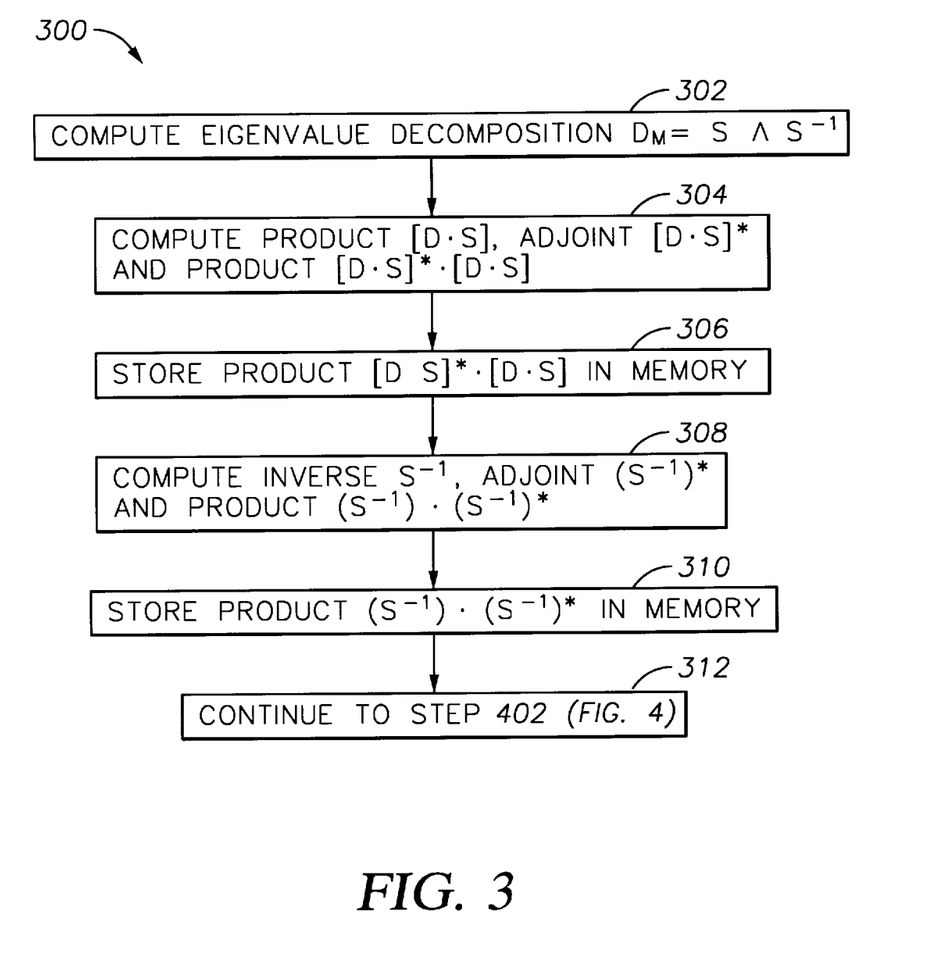
FIG. 3 is a schematic diagram of the preliminary steps of the method of the present invention for surface multiple attenuation.
Figure 4:
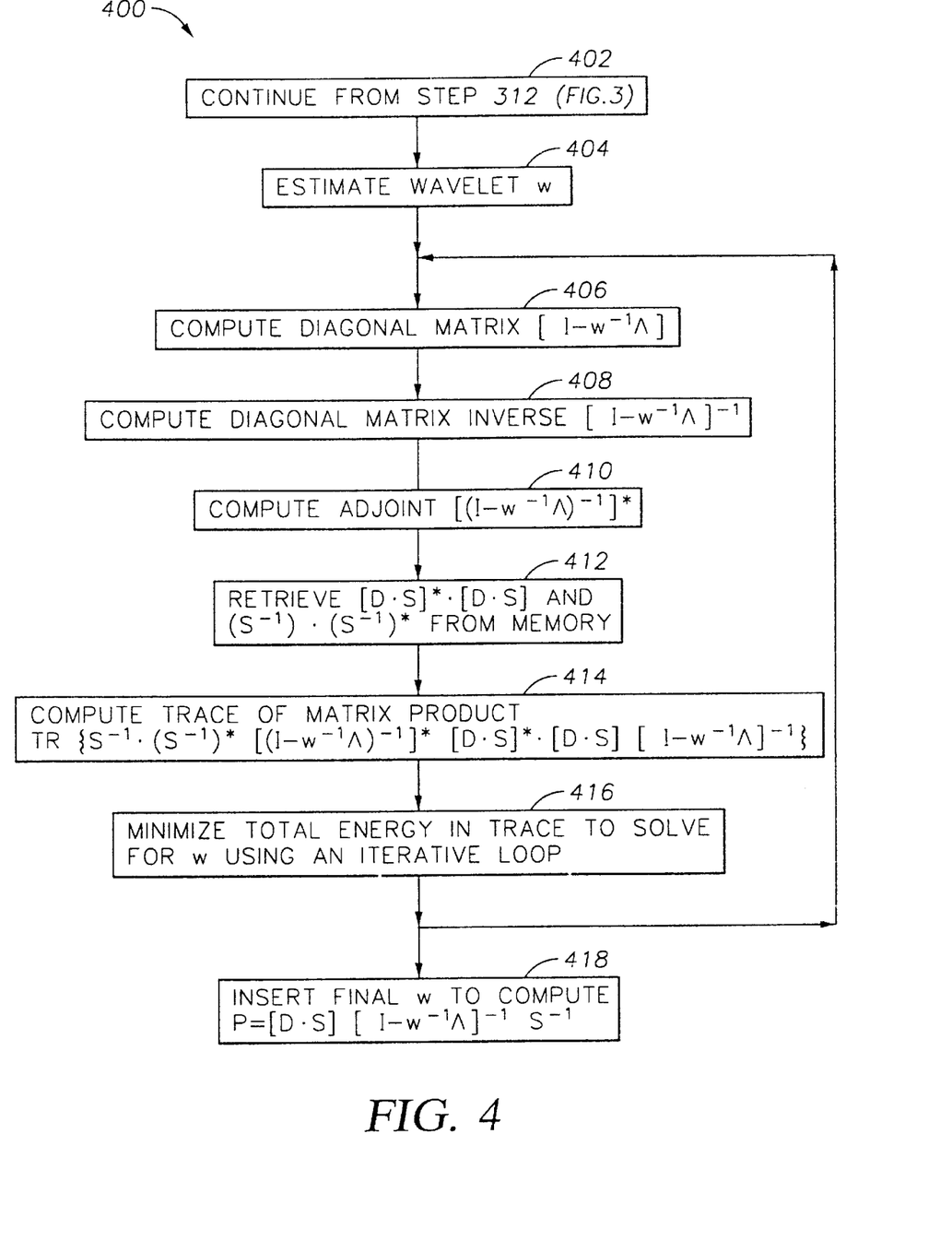
FIG. 4 is a schematic diagram of the remaining steps comprising the iterative loop of the method of the present invention for surface multiple attenuation.

FIGS. 3 and 4 show schematic diagrams of the method of the present invention for computing primary matrix $P(s,r)$, as designated in Block 220 of FIG. 2, for non-ideal data. The preliminary steps of the method are shown in FIG. 3 and are designated generally as 300. Eigenvalue decomposition $D_M = S \Lambda S^{-1}$ of the modified matrix $D_M(s,r)$ is computed, as shown in Block 302. Here the columns of matrix $S(s,r)$ are constructed from the eigenvectors of modified matrix $D_M$ and matrix $\Lambda(s,r)$ is a diagonal matrix whose diagonal elements are the corresponding eigenvalues of modified matrix $D_M$. Matrix product D S is computed once, conjugate transpose $[D\ S]^*$ is computed once, and matrix product $[D\ S]^*[D\ S]$ is computed once, as shown in Block 304. Then the matrix product $[D\ S]^*[D\ S]$ is saved in memory, as shown in Block 306. Matrix inverse $S^{-1}$ of the matrix S is also computed once, conjugate transpose $[D\ S]$ is computed once, and matrix product $S^{-1}(S^{-1})^*$ is computed once, as shown in Block 308. The matrix product $S^{-1}(S^{-1})^*$ is also saved in memory, as shown in Block 310. The point at which the schematic diagram of FIG. 3 continues onto FIG. 4 is shown by Block 312.

The remaining steps comprising the iterative loop in the method of the present invention for computing matrix $P(s,r)$ are shown in FIG. 4 and are designated generally as 400. The point at which the schematic diagram of FIG. 4 continues from Block 320 of FIG. 3 is shown by Block 402. An initial estimate for the value of the complex scalar representing the source wavelet w is made, as shown by Block 404. Diagonal matrix $[I-w^{-1}\Lambda]$ is computed, as shown in Block 406. Here I is the identity matrix. The matrix inverse $[I-w^{-1}\Lambda]^{-1}$ of the diagonal matrix $[I-w^{-1}\Lambda]$ is computed, as shown in Block 408. Conjugate transpose $[I-w^{-1}\Lambda]^{-1}$ of the matrix inverse $[(I-w^{-1}\Lambda)^{-1}]^*$ is computed, as shown in Block 410. The matrix product $[D\ S]^*[D\ S]$ and the matrix product $S^{-1}(S^{-1})^*$ are retrieved from memory, as shown in Block 412. An expression for the energy in the primary matrix $P(s,r)$ is computed from the matrix trace of the matrix product given by Eq. (20), $$E = tr\{S^{-1}(S^{-1})^*[(I-w^1\Lambda)^{-1}]^*[D\ S]^*[D\ S]\ (I-w^{-1}\Lambda)^{-1}\},$$

as a function of the wavelet w, as shown in Block 414. A value for the source wavelet w is computed by minimizing the total energy in the expression for P in w, as shown in Block 416. The minimization is accomplished by an iterative loop of Blocks 406, 408, 410, 412, 414 and 416. Finally, matrix $P(s,r)$ is computed by inserting the final computed value for the source wavelet w into the expression given by Eq. (17), $$P = [D\ S][I-w^{-1}\Lambda]^{-1}S^{-1},$$

as shown in Block 418.

An alternative embodiment of the method of the present invention for computing the primary matrix $P(s,r)$ uses the form of Eq. (22) rather than Eq. (20) for computing the trace of the matrix product in Block 414. Then the products of the terms given by $a_{i,j}$ and $b_{j,i}$ can be precomputed once and stored, as discussed above, reducing the number of operations for all iterations but the first from $3N^2$ to $2N^2$. This is equivalent to computing, saving and retrieving the matrix product $S^{-}(S^{-1})*[D\ S]*[D\ S]$ rather than the separate products $[D\ S]*[D\ S]$ and $S^{-1}(S^{-1})*$ in Blocks 304, 306, 308, 310 and 412, respectively.

In summary, the present invention discloses a computationally more efficient method for iteratively minimizing the energy in the surface multiple attenuation inversion equation of Eq. (17), which follows from the eigenvalue decomposition of Eq. (15). In addition, the present invention determines the average source wavelet imbedded in the wavefield. Furthermore, in an alternative embodiment, small values in the diagonal matrix $[I-w^{-1}\Lambda]$ can be ignored once they are found, as well as the corresponding eigenvectors in S and the corresponding row vectors in $S^{-1}$. This technique can improve the numerical stability of the matrix inversion calculation and further decrease the computational cost. In another alternative embodiment, the matrix computations in the iteration steps may be carried out for predetermined groups of frequencies, such as swaths of frequencies, rather than for each individual frequency. This technique will further reduce the computational cost.

The present invention has been described with a certain degree of specificity. Variations will occur to those skilled in the art which are within the scope of the invention, which is limited only by the appended claims.

We claim:

1. A method for substantially attenuating surface multiples from a marine seismic signal, comprising the steps of:

recording said marine seismic signal;

truncating said marine seismic signal in time to generate a truncated signal, transforming said marine seismic signal from time domain into frequency domain to generate a transformed signal represented by matrix D, and transforming said truncated signal from time domain into frequency domain to generate a transformed truncated signal represented by truncated matrix $D_T$;

computing eigenvalue decomposition $D_T = S\ \Lambda\ S^{-1}$ of said transformed truncated matrix $D_T$, where $\Lambda$ is a diagonal matrix whose elements are eigenvalues $\lambda_i$ of $D_T$, S is a square matrix whose columns are corresponding eigenvectors of $D_T$ and $S^{-1}$ is an inverse matrix of S;

solving for a source wavelet w by minimizing total energy in trace of matrix product $$\text{tr}\{S^{-1}(S^{-1})*[(I-w^{-1}\Lambda)^{-1}]*[D\ S]*[D\ S][I-w^{-1}\Lambda]^{-1}\}$$

in an iterative loop;

solving for a primary matrix P by inserting said solved value for said source wavelet w into expression $$P = [D\ S][I-w^{-1}\Lambda]^{-1}S^{-1};$$

and inverse transforming said primary matrix P from frequency domain into time domain, to generate a marine seismic signal with surface multiples substantially attenuated.

2. The method of claim 1, wherein said computing eigenvalue decomposition step comprises the steps of:

modifying said transformed truncated signal to include obliquity, scale and phase factors required by the Kirchhoff integral, thereby generating a modified signal represented by modified matrix $D_M$; and computing eigenvalue decomposition $D_M = S\Lambda S^{-1}$ of said modified matrix $D_M$.

3. The method of claim 1, further comprising the step of:

selectively ignoring the eigenvectors in S and the corresponding row vectors in $S^{-1}$ which correspond to small values in said inverse diagonal matrix $[I-w^{-1}\Lambda]^{-1}$.

4. The method of claim 1, wherein said trace of matrix product is expressed as $$E = \sum_{i=1}^{i=N}(1-w^{-1}\lambda_i)^{-1}\sum_{j=1}^{j=N}a_{i,j}\left[(1-w^{-1}\lambda_j)^{-1}\right]^{\dagger}b_{j,i}$$

where $a_{i,j}$ are elements of matrix $A = S^{-1}(S^{-1})*$ and $b_{j,i}$ are elements of matrix $B = [D\ S]*[D\ S]$.

5. The method of claim 1, wherein the step of solving for source wavelet w comprises the steps of:

using a tapering matrix T to taper the matrix rows of matrix D; and solving for source wavelet w by minimizing total energy in trace of matrix product $$\text{tr}\{S^{-1}(S^{-1})*[(I-w^{-1}\Lambda)^{-1}]*[D\ S]*[T\ T\ D\ S][I-w^{-1}\Lambda]^{-1}\}$$

in an iterative loop.

6. The method of claim 1, wherein the step of solving for source wavelet w comprises the steps of:

using a tapering matrix T to taper the matrix columns of matrix D; and solving for source wavelet w by minimizing total energy in trace of matrix product $$\text{tr}\{S^{-1}T\ T(S^{-1})*[(I-w^{-1}\Lambda)^{-1}]*[D\ S]*[D\ S][I-w^{-1}\Lambda]^{-1}\}$$

in an iterative loop.

7. A method for substantially attenuating surface multiples from a marine seismic signal, comprising the steps of:

(a) recording said marine seismic signal and truncating said marine seismic signal in time to generate a truncated signal, transforming said marine seismic signal from time domain into frequency domain to generate a transformed signal represented by matrix D, and transforming said truncated signal from time domain into frequency domain to generate a transformed truncated signal represented by truncated matrix $D_T$;

(b) computing eigenvalue decomposition $D_T = S\ \Lambda\ S^{-1}$ of said transformed truncated matrix $D_T$, where $\Lambda$ is a diagonal matrix whose elements are eigenvalues $\lambda_i$, of $D_T$, S is a square matrix whose columns are corresponding eigenvectors of $D_T$ and $S^{-1}$ is an inverse matrix of S;

(c) computing matrix product D S, computing conjugate transpose [D S]* and computing matrix product [D S]*[D S], and saving said matrix product [D S]*[D S] in memory;

(d) computing matrix inverse $S^{-1}$ of said matrix S, computing conjugate transpose $(S^{-1})*$ and computing matrix product $S^{-1}(S^{-1})*$, and saving said matrix product $S^{-1}(S^{-1})*$ in memory;

(e) making initial estimate of a source wavelet w;

(f) computing diagonal matrix $[I-w^{-1}\Lambda]$, computing matrix inverse $[I-w^{-1}\Lambda]^{-1}$ of said diagonal matrix $[I-w^{-1}\Lambda]$ and computing conjugate transpose $[(I-w^{-1}\Lambda)^{-1}]^*$ of said matrix inverse $[I-w^{-1}\Lambda]^{-1}$;

(g) retrieving said matrix products $[D\ S]^*[D\ S]$ and $S^{-1}(S^{-1})^*$ from said memory;

(h) computing trace of matrix product $$\mathrm{tr}\{S^{-1}(S^{-1})^*[(I-w^{-1}\Lambda)^{-1}]^*[D\ S]^*[D\ S][I-w^{-1}\Lambda]^{-1}\}$$

in terms of said source wavelet w;

(i) iterating said steps (f) through (h) to solve for said source wavelet w by minimizing total energy in said trace of matrix product $$\mathrm{tr}\{S^{-1}(S^{-1})^*[(I-w^{-1}\Lambda)^{-1}]^*[D\ S]^*[D\ S][I-w^{-1}\Lambda]\};$$

(j) solving for a primary matrix P by inserting said solved value for said source wavelet w into expression $$P=[D\ S][I-w^{-1}\Lambda]^{-1}S^{-1};$$

and (k) inverse transforming said primary matrix P from frequency domain into time domain, to generate a marine seismic signal with surface multiples substantially attenuated.

8. The method of claim 7, wherein said step (b) comprises the steps of:

modifying said transformed truncated signal to include obliquity, scale and phase factors required by the Kirchhoff integral, thereby generating a modified signal represented by modified matrix $D_M$; and computing eigenvalue decomposition $D_M = S\Lambda S^{-1}$ of said modified matrix $D_M$.

9. The method of claim 7, further comprising the step of:

selectively ignoring the eigenvectors in S and the corresponding row vectors in $S^{-1}$ which correspond to small values in said inverse diagonal matrix $[I-w^{-1}\Lambda]^{-1}$.

10. A method for substantially eliminating surface multiples from a marine seismic signal, comprising the steps of:

(a) recording said marine seismic signal and truncating said marine seismic signal in time to generate a truncated signal;

(b) transforming said marine seismic signal from time domain into frequency domain to generate a transformed signal and transforming said truncated signal from time domain into frequency domain to generate a transformed truncated signal;

(c) modifying said transformed truncated signal to include obliquity, scale and phase factors required by the Kirchhoff integral, thereby generating a modified signal;

(d) representing said transformed signal by data cube D(s,r,f) and representing said modified signal by modified data cube $D_M$(s,r,f), where s is source location, r is receiver location, and f is frequency;

(e) extracting data matrix D(s,r) from said data cube D(s,r,f) for a frequency f and extracting modified matrix $D_M$(s,r) from modified data cube $D_M$(s,r,f) for said frequency f;

(f) computing eigenvalue decomposition $D_M = S\Lambda S^{-1}$ of said modified matrix $D_M$, where $\Lambda$ is a diagonal matrix whose elements are eigenvalues $\lambda_i$ of $D_M$, S is a square matrix whose columns are corresponding eigenvectors of $D_M$ and $S^{-1}$ is an inverse matrix of S;

(g) computing matrix product D S, computing conjugate transpose $[D\ S]^*$ and computing matrix product $[D\ S]^*[D\ S]$, and saving said matrix product $[D\ S]^*[D\ S]$ in memory;

(h) computing matrix inverse $S^{-1}$ of said matrix S, computing conjugate transpose $(S^{-1})^*$ and computing matrix product $S^{-1}(S^{-1})^*$, and saving said matrix product $S^{-1}(S^{-1})^*$ in memory;

(i) making initial estimate of a source wavelet w;

(j) computing diagonal matrix $[I-w^{-1}\Lambda]$, computing matrix inverse $[I-w^{-1}\Lambda]^{-1}$ of said diagonal matrix $[I-w^{-1}\Lambda]$ and computing conjugate transpose $[(I-w^{-1}\Lambda)^{-1}]^*$ of said matrix inverse $[I-w^{-1}\Lambda]^{-1}$;

(k) retrieving said matrix products $[D\ S]^*[D\ S]$ and $S^{-1}(S^{-1})$ from said memory;

(l) computing trace of matrix product $$\mathrm{tr}\{S^{-1}(S^{-1})^*[(I-w^{-1}\Lambda)^{-1}]^*[D\ S]^*[D\ S][I-w^{-1}\Lambda]^{-1}\}$$

in terms of said source wavelet w;

(m) iterating said steps (j) through (l) to solve for said source wavelet w by minimizing total energy in said trace of matrix product $$\mathrm{tr}\{S^{-1}(S^{-1})^*[(I-w^{-1}\Lambda)^{-1}]^*[D\ S]^*[D\ S][I-w^{-1}\Lambda]^{-1}\};$$

(n) solving for a primary matrix P(s,r) by inserting said solved value for wavelet w into expression $$P=[D\ S][I-w^{-1}\Lambda]^{-1}S^{-1};$$

(o) inserting said primary matrix P(s,r) into data cube P(s,r,f) for said frequency f;

(p) repeating said steps (e) through (o) for each frequency f in said data cube D(s,r,f); and (q) inverse transforming said data cube P from frequency domain into time domain, to generate a marine seismic signal with surface multiples substantially attenuated.

11. The method of claim 10, further comprising the step of:

selectively ignoring the eigenvectors in S and the corresponding row vectors in $S^{-1}$ which correspond to small values in said inverse diagonal matrix $[I-w^{-1}\Lambda]^{-1}$.

12. The method of claim 10, further comprising the step of:

carrying out the iterations in step (m) for predetermined groups of frequencies rather than for each individual frequency.

13. A method for substantially attenuating surface multiples from a marine seismic signal, the method comprising:

(a) recording the marine seismic signal;

(b) truncating said marine seismic signal to generate a truncated signal;

(c) transforming the marine seismic signal from time domain into frequency domain to generate a transformed signal represented by a first matrix;

(d) transforming said truncated signal from time domain into frequency domain to generate a transformed truncated signal represented by a truncated matrix;

(e) solving an eigenvalue decomposition problem for the truncated matrix to give a diagonal eigenvalue matrix and a square matrix S whose columns are eigenvectors of the truncated matrix, said matrix S having n rows and n columns;

(f) solving for a trace wavelet by an iterative process including a plurality of iterations in which at least one iteration after a first iteration is accomplished by multiplication operations of an order no greater than $n^2$;

(g) solving for a primary matrix in terms of the matrix S, the first matrix, and the solved trace wavelet; and (h) inverse transforming the primary matrix from the frequency domain into the time domain to generate a marine seismic signal with surface multiples substantially attenuated.

14. The method of claim 13 wherein solving the eigenvalue decomposition problem further comprises modifying the transformed truncated signal to include obliquity, scale and phase factors required by a Kirchhoff intergral.

15. The method of claim 13 further comprising selectively ignoring the columns of the square matrix corresponding to small eigenvalues.

16. The method of claim 13 wherein solving for the trace wavelet further comprises using a tapering matrix to taper the rows of the first matrix.

17. The method of claim 13 wherein solving for the trace wavelet further comprises minimizing the trace of a matrix product that is a function of the trace wavelet, the diagonal eigenvalue matrix, the first matrix and the square matrix.

* * * * *